United States Patent
Cook et al.

(10) Patent No.: US 12,088,641 B2
(45) Date of Patent: *Sep. 10, 2024

(54) VERIFYING DELIVERY OF RICH CALL DATA OBJECT TO A TERMINATING WIRELESS DEVICE

(71) Applicant: T-Mobile USA, Inc., Bellevue, WA (US)

(72) Inventors: Victoria Cook, Overland Park, KS (US); Homer Nicolas Filart, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/486,553

(22) Filed: Oct. 13, 2023

(65) Prior Publication Data

US 2024/0171619 A1    May 23, 2024

Related U.S. Application Data

(63) Continuation of application No. 17/990,468, filed on Nov. 18, 2022, now Pat. No. 11,824,904.

(51) Int. Cl.
*H04L 65/1069* (2022.01)
*H04L 65/1104* (2022.01)
*H04L 65/403* (2022.01)

(52) U.S. Cl.
CPC ...... *H04L 65/1069* (2013.01); *H04L 65/1104* (2022.05); *H04L 65/403* (2013.01)

(58) Field of Classification Search
CPC ............. H04L 65/1069; H04L 65/1076; H04L 65/1104; H04L 65/403
See application file for complete search history.

(56) References Cited

U.S. PATENT DOCUMENTS

| 7,177,627 B2 | 2/2007 | Melaku et al. |
| 7,590,092 B2 | 9/2009 | Milton et al. |

(Continued)

FOREIGN PATENT DOCUMENTS

| CN | 101690376 A | 3/2010 |
| CN | 101946529 A | 1/2011 |

(Continued)

OTHER PUBLICATIONS

Calltools, "Rich Call Data: The Future of Caller ID" <https://calltools.com/blog/rich-call-data-the-future-of-caller-id/> (Year: 2022), 4 pages.

*Primary Examiner* — Kostas J Katsikis
(74) *Attorney, Agent, or Firm* — Perkins Coie LLP

(57) ABSTRACT

A system for verifying delivery of a graphical object to a device receives a session initiation protocol (SIP) request including a rich call data (RCD) extension with a URL to a graphical object stored at a content delivery network (CDN). The graphical object indicates the originating source of the SIP request and is to be presented on a display of the device upon receiving the SIP request. The system modifies the URL to include a unique identifier and sends the SIP request message with the modified URL to the device. The system receives a delivery confirmation message including a copy of the unique identifier from the CDN indicating that the graphical object was delivered to the device. The system verifies delivery of the graphical object to the device based on the copy of the unique identifier in the delivery confirmation message.

20 Claims, 4 Drawing Sheets

(56) References Cited

U.S. PATENT DOCUMENTS

| | | |
|---|---|---|
| 7,613,449 B2 | 11/2009 | Romppanen et al. |
| 7,643,816 B2 | 1/2010 | Romppanen et al. |
| 7,668,159 B2 | 2/2010 | Buckley et al. |
| 7,710,950 B2 | 5/2010 | Buckley et al. |
| 7,733,853 B2 | 6/2010 | Moinzadeh et al. |
| 7,865,607 B2 | 1/2011 | Sonalkar et al. |
| 7,969,956 B2 | 6/2011 | Borella et al. |
| 7,996,007 B2 | 8/2011 | Bantukul |
| 8,036,201 B2 | 10/2011 | Moinzadeh et al. |
| 8,099,118 B2 | 1/2012 | Chaudry et al. |
| 8,150,364 B2 | 4/2012 | Dickinson et al. |
| 8,315,608 B2 | 11/2012 | Cha |
| 8,335,530 B2 | 12/2012 | Chaudry et al. |
| 8,345,666 B2 | 1/2013 | Clair et al. |
| 8,369,319 B2 | 2/2013 | Buckley et al. |
| 8,369,825 B2 | 2/2013 | Dickinson et al. |
| 8,499,082 B2 | 7/2013 | Roach et al. |
| 9,584,553 B2 | 2/2017 | Swaminathan et al. |
| 9,674,233 B2 | 6/2017 | Efrati |
| 9,706,378 B2 | 7/2017 | Mahendran |
| 9,712,668 B2 | 7/2017 | Arbe et al. |
| 9,814,081 B2 | 11/2017 | Wang et al. |
| 9,888,368 B1 | 2/2018 | Bertz et al. |
| 9,967,723 B2 | 5/2018 | Sabeur et al. |
| 2006/0135157 A1 | 6/2006 | Baek et al. |
| 2007/0299939 A1 | 12/2007 | Johnston |
| 2008/0013530 A1 | 1/2008 | Narasimhan et al. |
| 2008/0176589 A1 | 7/2008 | Bantukul |
| 2009/0168985 A1 | 7/2009 | Yu et al. |
| 2009/0219925 A1 | 9/2009 | Donovan |
| 2010/0135269 A1 | 6/2010 | Koch et al. |
| 2011/0044325 A1 | 2/2011 | Buckley |
| 2011/0107364 A1 | 5/2011 | Lajoie et al. |
| 2012/0076136 A1 | 3/2012 | Jackson |
| 2012/0243471 A1 | 9/2012 | Boulos et al. |
| 2022/0086276 A1 | 3/2022 | Ranalli |
| 2022/0329637 A1 | 10/2022 | Murphy et al. |
| 2022/0329689 A1* | 10/2022 | Murphy ............ H04M 3/42042 |
| 2023/0362299 A1* | 11/2023 | Ranalli ............ H04M 3/42059 |

FOREIGN PATENT DOCUMENTS

| | | |
|---|---|---|
| CN | 101455115 B | 8/2013 |
| CN | 104219736 A | 12/2014 |
| CN | 103748810 B | 5/2017 |
| CN | 107113584 A | 8/2017 |
| CN | 107466114 B | 6/2020 |
| CN | 106797594 B | 7/2020 |
| DE | 102008054143 B4 | 11/2014 |
| DE | 112015006846 T5 | 5/2018 |
| EP | 1986389 A1 | 10/2008 |
| EP | 2028899 A2 | 2/2009 |
| EP | 2140691 A1 | 1/2010 |
| EP | 2232894 A2 | 9/2010 |
| EP | 2257103 A1 | 12/2010 |
| EP | 2285064 A1 | 2/2011 |
| EP | 1909455 B1 | 6/2011 |
| EP | 2030471 B1 | 7/2012 |
| EP | 2367335 B1 | 12/2012 |
| EP | 2717554 A1 | 4/2014 |
| EP | 2910006 A1 | 8/2015 |
| EP | 2742614 B1 | 3/2016 |
| EP | 3062483 A1 | 8/2016 |
| EP | 2393260 B1 | 1/2017 |
| EP | 1988697 B1 | 2/2018 |
| JP | 4620099 B2 | 11/2010 |
| JP | 4944988 B2 | 3/2012 |
| JP | 5119243 B2 | 10/2012 |
| JP | 5622931 B2 | 10/2014 |
| JP | 5706046 B2 | 3/2015 |
| JP | 5734486 B2 | 4/2015 |
| KR | 100770931 B1 | 10/2007 |
| KR | 100902815 B1 | 6/2009 |
| KR | 100940548 B1 | 2/2010 |
| KR | 101070956 B1 | 10/2011 |
| KR | 101185669 B1 | 9/2012 |
| KR | 101497287 B1 | 2/2015 |
| KR | 101532524 B1 | 7/2015 |
| WO | 0215519 A2 | 2/2002 |
| WO | 2006049421 A1 | 5/2006 |
| WO | 2006052083 A1 | 5/2006 |
| WO | 2007112594 A1 | 10/2007 |
| WO | 2007140582 A1 | 12/2007 |
| WO | 2007143266 A2 | 12/2007 |
| WO | 2008011233 A2 | 1/2008 |
| WO | 2008088889 A1 | 7/2008 |
| WO | 2008088890 A1 | 7/2008 |
| WO | 2008132543 A1 | 11/2008 |
| WO | 2008134391 A1 | 11/2008 |
| WO | 2008150749 A1 | 12/2008 |
| WO | 2009000868 A2 | 12/2008 |
| WO | 2009088814 A2 | 7/2009 |
| WO | 2009089087 A1 | 7/2009 |
| WO | 2009094915 A1 | 8/2009 |
| WO | 2009131899 A2 | 10/2009 |
| WO | 2009152162 A1 | 12/2009 |
| WO | 2010084497 A1 | 7/2010 |
| WO | 2013022470 A1 | 2/2013 |
| WO | 2014008311 A1 | 1/2014 |
| WO | 2014105762 A1 | 7/2014 |
| WO | 2015063531 A1 | 5/2015 |
| WO | 2017034511 A1 | 3/2017 |
| WO | 2017218177 A1 | 12/2017 |
| WO | 2021205240 A1 | 10/2021 |
| WO | 2022060705 A1 | 3/2022 |

* cited by examiner

VERIFYING DELIVERY OF RICH CALL DATA OBJECT TO A TERMINATING WIRELESS DEVICE

CROSS-REFERENCE TO RELATED APPLICATIONS

This application is a continuation of U.S. patent application Ser. No. 17/990,468, filed on Nov. 18, 2022, entitled VERIFYING DELIVERY OF RICH CALL DATA OBJECT TO A TERMINATING WIRELESS DEVICE, which is hereby incorporated by reference in its entirety.

BACKGROUND

Rich call data (RCD) is a technology for relaying caller identification information to a terminating wireless network when connecting a voice call. The RCD can include a name and/or other identifying information associated with a call originator that is displayed on a display of a wireless or wireline device in a telecommunications network. The RCD can also include graphical objects such as logos or photos that are associated with the call originator. The RCD can help a user receiving the voice call on the terminating wireless device to decide whether to answer the call or not. For example, the RCD can persuade the user to answer a call that comes from a reliable call originator (e.g., a friend, a family member, or a familiar organization or company). In contrast, if no RCD identification information is displayed, or the identification information indicates a call originator that the user does not want to connect with, the user may decide to not answer the call. Thus, the RCD is, for example, a helpful tool for avoiding robocalls and scam calls.

As an example, a user can be expecting a call from a retail store. When the retail store initiates a voice call to the user, the RCD can provide an indication to the user that the incoming call is from the retail store. The indication can include a logo associated with the retail store that will be displayed on the user's wireless device as the call is received. The logo provides the user with a convenient and quick way to determine that the call is made from a particular source. The user can then answer the call with increased confidence of the origin of the call.

BRIEF DESCRIPTION OF THE DRAWINGS

Detailed descriptions of implementations of the present technology will be described and explained through the use of the accompanying drawings.

Figure 1:
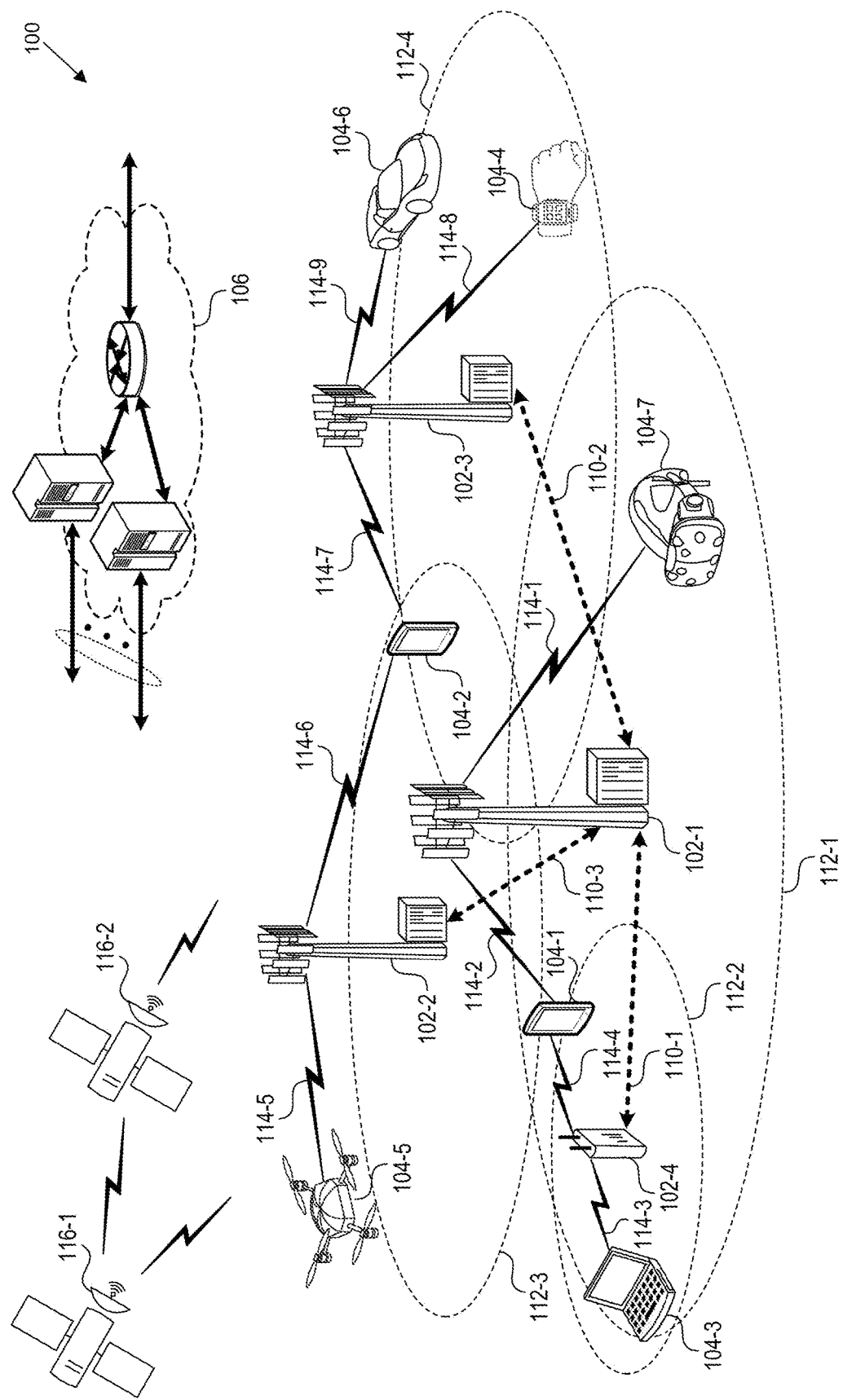
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology relates to a rich call data (RCD) system for verifying the delivery of an object (e.g., a graphical object) to a device (e.g., a wireless device or a wireline device) in a telecommunications network. The graphical object is to be displayed on a display of the device when the device receives a voice call request (e.g., a session initiation protocol (SIP) request). The graphical object can allow a user of the device to easily confirm the identification of the originator of the voice call request. For example, the graphical object can include a logo or a photograph associated with the call originator. The graphical object can be retrieved from a content delivery network (CDN) based on a uniform resource locator (URL) that is included in the voice call request. To verify that the graphical object was delivered to the device for display, the RCD system can modify the URL with a unique identifier when sending the voice call request to the device. After the CDN has delivered the graphical object to the device, the CDN can send a delivery confirmation to the RCD system. The delivery confirmation includes the unique identifier that can then be compared to the unique identifier of the modified URL that is stored by the RCD system.

The verification of the delivery of the graphical object can be useful for, for example, allocating payments for the service of delivering the graphical object to the device. For example, sending the graphical object can be part of a fee-based service provided by the RCD system. The verification can allow the RCD system to collect data confirming that the service has been performed and receive payments for the service accordingly.

In one example, a system is configured to verify the delivery of a graphical object to a device on a terminating end of a voice call when an originating source attempts to connect the voice call with the device over a telecommunications network. The system can receive a SIP request message to connect the voice call from the originating source to the device on the telecommunications network. The SIP request message can include a RCD extension with a uniform resource locator (URL) to the graphical object stored at a CDN. The graphical object is indicative of the originating source of the SIP request message and the graphical object is configured to be presented on a display of the device upon receiving the SIP request message. The system can modify the URL to include a unique identifier for the voice call terminating at the device and send the SIP request message including the RCD extension with the modified URL to the device. The system can store a record including a first copy of the unique identifier in association with the voice call for the device. The system can also receive a delivery confirmation message from the CDN indicating that the graphical object was delivered to the device. The delivery confirmation message includes a second copy of the unique identifier. The system can verify the delivery of the graphical object to the device based on a confirmation that the first copy of the unique identifier included in the record matches the second copy in the delivery confirmation message.

In another example, a method can include receiving a session initiation protocol (SIP) request message to connect the voice call from the originating source to the device on the telecommunications network. The SIP request can be received by a RCD verification subsystem of a system associated with a telecommunications network. The SIP request message can include a RCD extension with a URL to the graphical object stored at a CDN, and the graphical object can be configured to be presented on a display of the device upon receiving the SIP request message. The method can include modifying the URL to include a unique identifier for the voice call terminating at the device by the RCD verification subsystem. The method can include storing a record including a first copy of the unique identifier in association with the voice call for the device by an RCD delivery confirmation subsystem. The method can also include receiving by the RCD delivery confirmation subsystem a delivery confirmation message indicating that the graphical object was delivered to the device from the CDN. The delivery confirmation message can include a second copy of the unique identifier. The method can include verifying the delivery of the graphical object to the device by the RCD delivery confirmation subsystem. The verification can be performed based on a confirmation that the first copy of the unique identifier included in the record matches the second copy in the delivery confirmation message.

In another example, a device is in communication with a rich call data (RCD) server system of a telecommunications network. The RCD server system includes an RCD verification subsystem and an RCD delivery confirmation subsystem. The device can receive a SIP request message to connect a voice call from an originating source to the device on the telecommunications network from the RCD verification subsystem. The SIP request message can include a RCD extension with a modified URL to a graphical object stored at a CDN. The modified URL can include a unique identifier for the voice call terminating at the device. The graphical object can be indicative of the originating source of the SIP request message. The graphical object can be configured to be presented on a display of the device upon receiving the SIP request message. The RCD delivery confirmation subsystem can store a record including a first copy of the unique identifier in association with the voice call for the device. The device can send an indication that the graphical object was received by the device to the CDN. The device can also cause the CDN to send the RCD delivery confirmation subsystem a delivery confirmation message indicating that the graphical object was delivered to the device. The delivery confirmation message can include a second copy of the unique identifier. The device can cause the CDN to verify the delivery of the graphical object to the device based on a confirmation that the first copy of the unique identifier included in the record matches the second copy in the delivery confirmation message.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the wireless telecommunications network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low User Plane latency. In yet another example of 6G, the network 100 can implement a converged Wi-Fi and Core architecture to increase and improve indoor coverage.

RCD Delivery Systems

Figure 2:
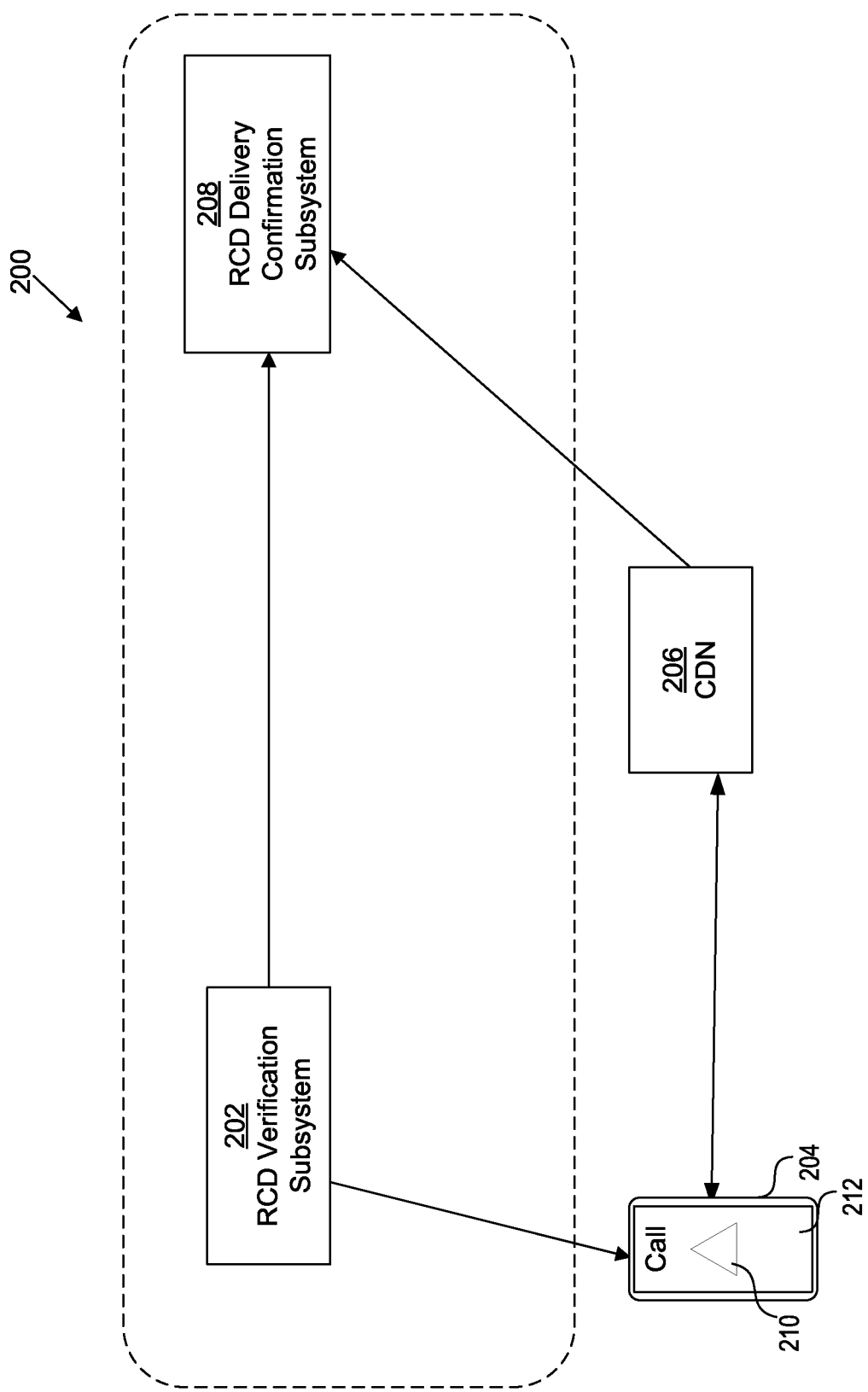
FIG. 2 is a block diagram that illustrates a rich call data (RCD) system for verifying delivery of RCD to a wireless device on a terminating end of a voice call.

FIG. 2 is a block diagram that illustrates an RCD system 200 (e.g., an RCD server system) for verifying the delivery of RCD to a wireless device on a terminating end of a voice call. The system 200 is associated with a telecommunications network. The system 200 can include at least one hardware processor and at least one non-transitory memory storing instructions. In one example, the server system corresponds to a computer system 400 described with respect to FIG. 4. The system 200 includes an RCD verification subsystem 202 and an RCD delivery confirmation subsystem 208 that are in communication with each other. The system 200 is in communication with wireless devices associated with the telecommunications network (e.g., a wireless device 204). The system 200 also includes or is in communication with a CDN 206.

The system 200 is for delivering RCD (e.g., a graphical object) to be displayed by the wireless devices in response to receiving SIP request messages to connect voice calls from call originators to terminating wireless devices (e.g., the wireless device 204). Furthermore, the system 200 is for verifying delivery of the RCD to the terminating wireless devices. Verifying delivery of the RCD can be significant, for example, for collecting fees for the service of delivering RCD to the wireless devices. Verifying delivery of the RCD can also be useful in tracking the quality of the service (e.g., to determine whether the RCD delivered as planned).

For example, a network service provider associated with the system 200 can sell customers a service of delivering RCD when connecting voice calls originated by the customers to wireless devices. The customer can be a private or public organization. For example, the customer can be a retail store, a company, a hospital, a police department, or a public service organization (e.g., a school district). For example, a company may wish to deliver its logo to the wireless device as the wireless devices receive voice calls from the company. A service agreement between the company and the network service provider can require that the network service provider offer an indication or evidence of how many voice calls were connected by the network service provider with successfully delivered RCD. In some implementations, the indication of successfully delivered RCD can be a basis for fees that can be collected by the network service provider.

The RCD verification subsystem 202 is configured to receive SIP request messages to connect voice calls from call originators to wireless devices on the telecommunications network. The SIP request messages can include RCD extension information. For example, an RCD extension includes a URL that can be used to retrieve a graphical object by the wireless device 204. The graphical object can then be displayed on a display (e.g., a display 212 of the wireless device 204) of the wireless device 204. The RCD verification subsystem 202 can also modify the RCD extensions to associate the RCD extension with the particular SIP request message. The modification can include appending the URL with a unique identifier.

The RCD delivery confirmation subsystem 208 is configured to receive and store information regarding the SIP request messages including the RCD extensions. The RCD delivery confirmation subsystem 208 can also receive and store delivery confirmations from the CDN. The RCD delivery confirmation subsystem 208 can compare the information regarding the SIP request messages including the RCD extensions and the delivery confirmations from the CDN to verify delivery. For example, to verify that an RCD included in a particular SIP request message was delivered, the RCD delivery confirmation subsystem 208 can match the unique identifier included in the information regarding the SIP request messages received from the RCD verification subsystem 202 with the unique identifier included the delivery confirmations from the CDN 206. The delivery can be confirmed when the unique identifiers are matched. The RCD delivery confirmation subsystem 208 can further communicate the delivery to an agency. For example, the agency can use this information to generate invoices for, or statements regarding, the RCD delivery service of a network service provider. In some implementations, the agency is a third-party agency that is separate from the system 200.

The CDN 206 is configured to store and deliver and/or distribute content to wireless devices via the Internet. A CDN refers to a geographically distributed network of servers and data centers that store content and allow access to the content. The CDN 206 can be configured to provide RCD content (e.g., graphical object flies) to wireless devices to be displayed upon receiving voice calls. For example, the CDN 206 can receive a request (e.g., an HTTPS GET request) from the wireless device 204 for retrieving image content (e.g., a graphical object). In response to the request, the CDN 206 transmits the image content identified in the request to the wireless device 204. The CDN 206 can further send delivery confirmation indicating that the image content was provided to the wireless device 204 to the RCD delivery confirmation subsystem 208. The CDN 206 can be part of the system 200 or separate from the system 200 (e.g., the CDN 206 is part of a third party system). For example, when the system 200 represents RCD-related internal network elements of a terminating service provider's network, the CDN 206 can be either part of the system 200 or separate from the system 206 so that the CDN 206 would be controlled by the system 200.

The wireless device 204 is configured to be in communication with the CDN 206 and the RCD verification subsystem 202, as shown. For example, the wireless device 204 is a mobile phone or a smartphone that is associated with the telecommunications network and is configured to receive voice calls. In particular, the wireless device 204 can receive voice calls initiated, maintained, and terminated based on SIP. Voice calls received via SIP may include multimedia data such as RCD. For example, the wireless device 204 can receive a SIP voice call request message from the RCD verification subsystem 202. The SIP voice call request can include RCD such as a URL for retrieving a graphical object that is to be displayed on the display 212 of the wireless device 204 when the SIP voice call request is received by the wireless device 204. The wireless device 204 can retrieve a graphical object file corresponding to the URL for the graphical object from the CDN 206. In some implementations, the wireless device 204 is configured to receive messages (e.g., chat messages) based on SIP. The messages can include the RCD and the wireless device 204 can retrieve a graphical object file indicated by the RCD in the messages.

Though FIG. 2 illustrates that the device receiving the voice calls is a wireless device (e.g., the wireless device 204), in some implementations the device receiving the voice calls is a wireline device including appropriate software and display capacity for receiving calls with RCD content.

Figure 3:
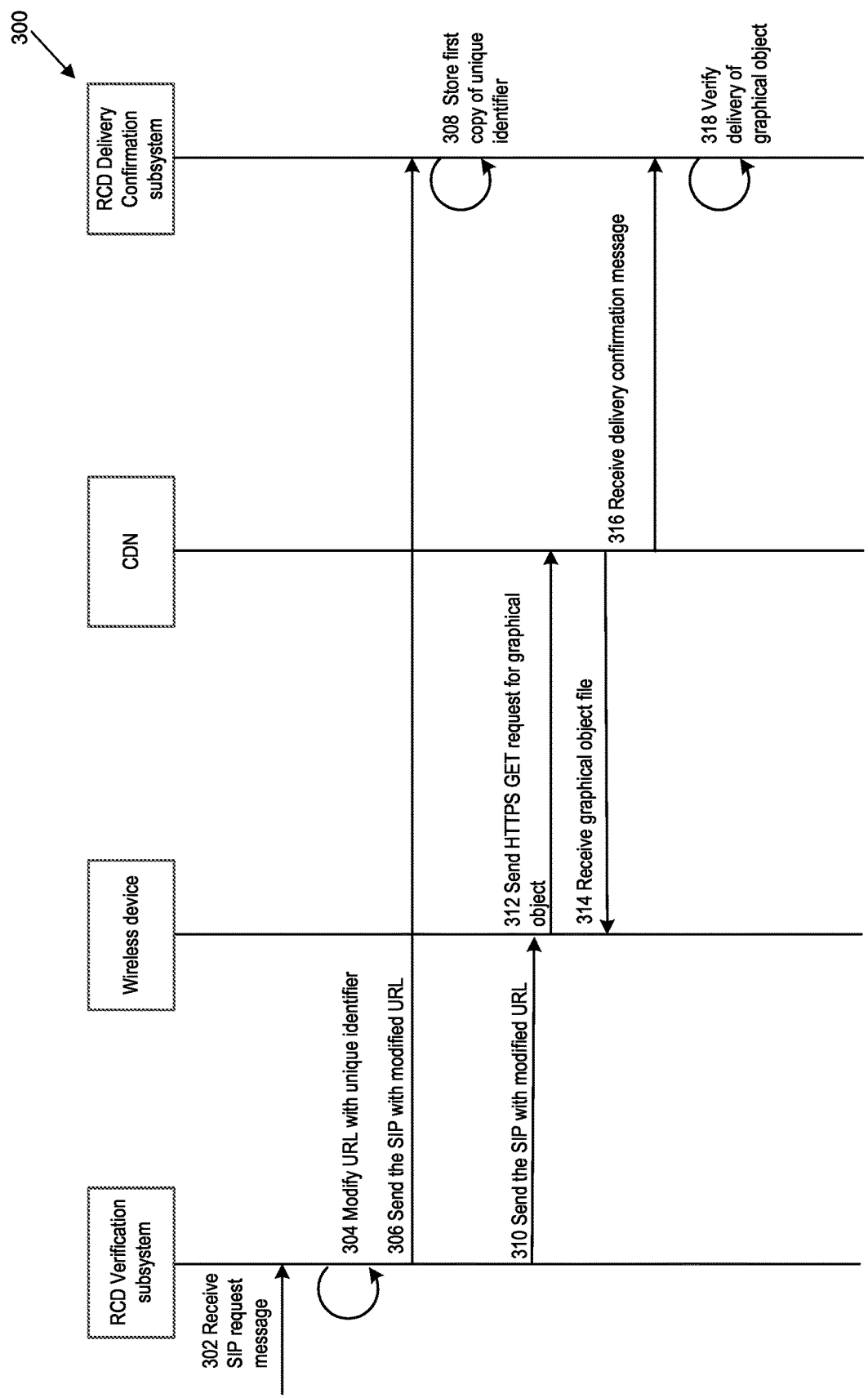
FIG. 3 is a sequence diagram that illustrates processes for verifying delivery of RCD to a wireless device on a terminating end of a voice call.

FIG. 3 is a sequence diagram that illustrates processes 300 for verifying the delivery of RCD to a device on a terminating end of a voice call. The processes 300 can be performed at an RCD server system (e.g., the server system 200 in FIG. 2). The system includes an RCD verification subsystem (e.g., the RCD verification subsystem 202) and an RCD delivery confirmation subsystem (e.g., the RCD delivery confirmation subsystem). The system can include, or be in communication with, a CDN (e.g., the CDN 206). The system is also in communication with a device (e.g., the wireless device 204 in FIG. 2). The system can be associated with a telecommunications network and include at least one hardware processor and at least one non-transitory memory storing instructions (e.g., the computer system 400 described with respect to FIG. 4). When the instructions are executed by at least one hardware processor, the server system performs the processes 300. The system is configured to verify the delivery of a graphical object (e.g., the graphical object 210) to a device (e.g., the wireless device 204) on a terminating end of a voice call when an originating source attempts to connect the voice call with the device over a telecommunications network.

At 302, the RCD verification subsystem can receive a SIP request message to connect a voice call from an originating source to the device on the telecommunications network. For example, the SIP request message can be received from an Internet Protocol (IP) multimedia subsystem (IMS) associated with the telecommunications network. In some implementations, the SIP request message is a SIP INVITE. The SIP INVITE refers to a SIP request message that initiates a SIP voice call. The SIP INVITE can include lines of text including a request line followed by headers text that can identify the call originator and indicate, for example, whether the call is forwarded or not. The SIP request message can include a rich call data (RCD) extension. The RCD extension can include a uniform resource locator (URL) to the graphical object stored at a CDN. In some implementations, the RCD extension can also include an RCD PASSporT indication. The RCD PASSporT indication refers to a protocol for authentication and verification of caller identification.

The graphical object is configured to be presented on a display of the device (e.g., the display 212 of the wireless device 204 in FIG. 2) upon receiving the SIP request message. The graphical object can be indicative of the originating source of the SIP request message. For example, when the user of the device receives an alert indicating of an incoming voice call (e.g., an alert sound and/or vibration), the device concurrently displays the graphical object on its display. In this way, the user of the device can conveniently visually get the information regarding the identification of the call originator. In some implementations, in addition or alternative to the graphical object, the RCD extension can include a URL to text, video, or audio content to be retrieved from the CDN.

In some implementations, the graphical object is an icon or a logo that is associated with the originating source. The icon or the logo on the display of the device can be indicative of the originating source of the SIP request message. For example, when the call originator is an organization (e.g., a retail store, a company, a hospital, a police department, or a public service organization), the graphical object can include a logo or an icon associated with the organization. The graphical object can help to persuade the user of the device to pick up the voice call. For example, a logo can provide an easy and quick visual indication of the identity of the call originator to the user of the device. In some implementations, the graphical object can include an icon or a logo as well as the name of the originating caller and/or other identifying information associated with the originating caller.

At 304, the RCD verification subsystem can modify the URL of the RCD extension to include a unique identifier for the voice call terminating at the device. In some implementations, modifying the URL to include the unique identifier includes appending the unique identifier as a prefix or as a suffix to the URL (e.g., adding the unique identifier to the beginning or to the end of the URL). The unique identifier can be different from any personal, identifiable information associated with the originating source or the device on the terminating end. For example, the unique identifier does not indicate a phone number, address, name, or any other information that could be associated with personal information of the call originator or the user associated with the device on the terminating end.

Instead, the unique identifier can include, for example, a session identifier associated with the SIP request message, and the modified URL can include the URL appended with the session identifier as a query string. The unique identifier can include a randomized or pseudo-randomized (e.g., generated by a deterministic and repeatable process) number generated by the system or an issued at (iat) code associated with the SIP request message including the RCD extension. The iat code can identify a time at which the SIP request message including the RCD extension was issued. The unique identifier, thereby, can associate the particular SIP request message with the modified URL and can be used to track whether the graphical object included in the URL of the RCD extension has been retrieved.

For example, the SIP request message can include the following URL:

"https://www.example.com/specificCompanyLoqo.bmp."
A URL modified with a unique identifier can include the URL appended with a SIP call session identifier that is associated with the SIP request message above, as follows:
  https://www.example.com/
    specificCompanyLoqo.bmp?callID=123asdf432sCall-
    Id=123asdf432s
or
  https://www.example.com/1490sdflkj234 specificCompanyLoqo.bmp At 306, the RCD verification subsystem can send the SIP request message including the RCD extension with the modified URL to the RCD delivery confirmation subsystem. In some implementations, the SIP request message send by the RCD verification subsystem to the RCD delivery confirmation subsystem is an abbreviated SIP request message that includes a subset (e.g., less than all) of the call information. The abbreviated SIP request can include information required for confirmation of the delivery and includes the modified URL. At 308, the RCD delivery confirmation subsystem can store a record including a first copy of the unique identifier in association with the voice call for the device. The RCD delivery confirmation subsystem can store multiple copies of different unique identifiers associated with different voice calls and query into the multiple copies of different unique identifiers based on respective unique identifiers.

At 310, the RCD verification subsystem can send the SIP request message including the RCD extension with the modified URL to the device. In response to sending the SIP request message including the RCD and the modified URL to the device on the terminating end, the device can retrieve the graphical object to be displayed from the CDN. For example, the SIP request message includes instructions for the device to retrieve a graphical object file stored at the CDN based on the URL.

At 312, the device can retrieve the graphical object by sending a Hypertext Transfer Protocol Secure (HTTPS) GET request to the CDN. An HTTPS GET refers to an HTTPS protocol method for requesting data from a specified resource (e.g., a URL). The CDN can, in response to the HTTPS GET request to send the device a graphical object file that corresponds to the graphical object stored at the URL identified in the SIP request message. At 314, the device receives the graphical object file corresponding to the graphical object from the CDN. The device can display the graphical object on the display of the wireless (e.g., the wireless device 204 displays the graphical object 210 on its display 212 in FIG. 2). The graphical object can be displayed concurrently with an indication that the device is receiving the SIP request message requesting to connect the voice call from the call originator.

At 316, in response to sending the graphical object file to the device, the RCD delivery confirmation subsystem can receive a delivery confirmation message from the CDN indicating that the graphical object was delivered to the device. The delivery confirmation message includes a second copy of the unique identifier.

At 318, the RCD delivery confirmation subsystem can verify the delivery of the graphical object to the device based on a confirmation that the first copy of the unique identifier included in the record matches the second copy in the delivery confirmation message. For example, upon receiving the delivery confirmation that includes the second copy of the unique identifier, the RCD delivery confirmation subsystem compares (or performs a query into) the different unique identifiers stored by the RCD delivery confirmation subsystem. When the RCD delivery confirmation subsystem matches the second copy of the unique identifier with the stored first copy of the unique identifier, the RCD delivery confirmation subsystem can determine that the graphical object associated with the particular SIP request message has been delivered to the device.

In response to verifying that the graphical object was sent to the device for display, the RCD delivery confirmation subsystem can send the delivery confirmation message to a confirmation agency (e.g., a third-party agency) for payment. For example, the verification can be used as means to demonstrate that delivery of the graphical object was successfully performed and a payment associated with the delivery can be charged.

The processes 300 can be used to count for multiple SIP request messages received from the same call originator that include the RCD extension with URL to the same graphical object. The multiple SIP request messages can be from the same call originator. The multiple SIP request messages can be requests to connect voice calls with a single device or with multiple different devices on the telecommunications network. For example, a company can originate multiple (e.g., 10, 20, 50, or 100) voice calls per day to its customers associated with different devices. The company can purchase a service from the network service provider associated with the RCD system to display the company's logo with each of the voice calls. The processes 300 can be used for verifying whether the graphical object was delivered, as included in the service.

In some implementations, the RCD verification subsystem can receive an additional SIP request message (e.g., different from the SIP request message received at 302) to connect an additional voice call from the same originating source to an additional device. The additional device can be different from the device and is on the telecommunications network. The additional SIP request message includes the same RCD extension with the URL to the graphical object stored at the content delivery network CDN. The RCD verification subsystem can modify the URL to include an additional unique identifier for the voice call terminating at the device. The additional unique identifier is different from the unique identifier used to modify the URL at 304. The RCD verification subsystem can send the additional SIP request message including the RCD extension with the modified URL to the additional device. The RCD verification subsystem can send the additional SIP request message including the RCD extension with the modified URL to the RCD delivery confirmation subsystem. The RCD delivery confirmation can store a record including a first copy of the additional unique identifier in association with the voice call for the additional device. The RCD delivery confirmation subsystem can receive from the CDN a delivery confirmation message indicating that the graphical object was delivered to the additional device. The delivery confirmation message can include a second copy of the additional unique identifier. The RCD delivery confirmation subsystem can verify the delivery of the graphical object to the additional device based on a confirmation that the first copy of the additional unique identifier included in the record matches the second copy in the delivery confirmation message. The system can, therefore, verify the delivery of the graphical object associated with the SIP request message at 302 as well as the additional SIP request message as separate deliveries.

SIP protocols, Uniform Resource Identifiers (URI), and certain features of RCD handling procedures are described in technical standards IETF RFC 3261 SIP: Session Initiation Protocol; IETF RFC 3986 Uniform Resource Identifier (URI): Generic Syntax GSMA RCC.20; ATIS-1000094, SHAKEN: Calling Name and Rich Data Handling Procedures; draft-ietf-sipcore-callinfo-rcd, SIP Call-info Parameters for Rich Call Data; draft-ietf-stir-passport-rcd, PASSporT Extension for Rich Call Data, all of which are incorporated herein in their entirety.

Computer System

Figure 4:
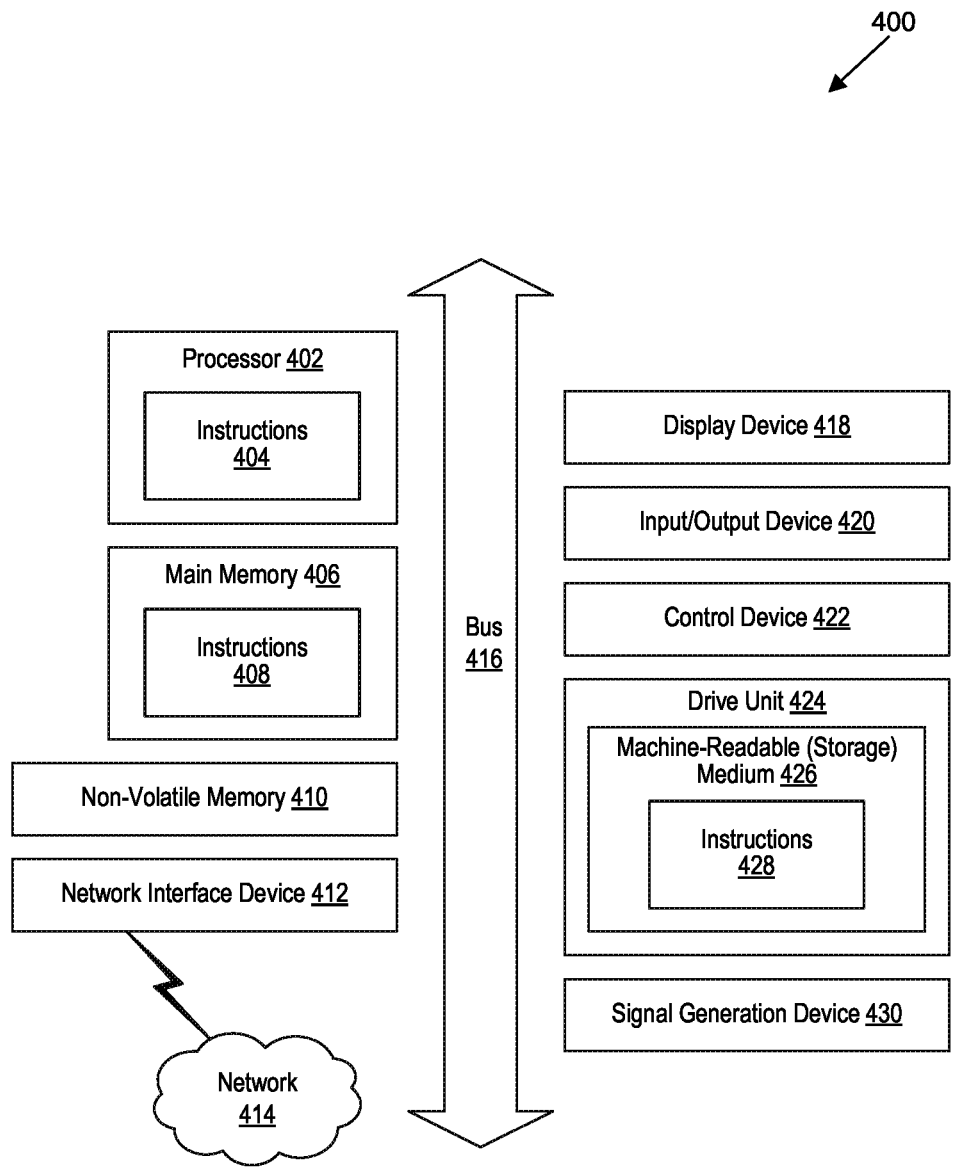
FIG. 4 is a block diagram that illustrates an example of a computer system in which at least some operations described herein can be implemented.

FIG. 4 is a block diagram that illustrates an example of a computer system 400 in which at least some operations described herein can be implemented. As shown, the computer system 400 can include: one or more processors 402, main memory 406, non-volatile memory 410, a network interface device 412, video display device 418, an input/output device 420, a control device 422 (e.g., keyboard and pointing device), a drive unit 424 that includes a storage medium 426, and a signal generation device 430 that are communicatively connected to a bus 416. The bus 416 represents one or more physical buses and/or point-to-point connections that are connected by appropriate bridges, adapters, or controllers. Various common components (e.g., cache memory) are omitted from FIG. 4 for brevity. Instead, the computer system 400 is intended to illustrate a hardware device on which components illustrated or described relative to the examples of the figures and any other components described in this specification can be implemented.

The computer system 400 can take any suitable physical form. For example, the computer system 400 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 400. In some implementation, the computer system 400 can be an embedded computer system, a system-on-chip (SOC), a single-board computer system (SBC) or a distributed system such as a mesh of computer systems or include one or more cloud components in one or more networks. Where appropriate, one or more computer systems 400 can perform operations in real-time, near real-time, or in batch mode.

The network interface device 412 enables the computer system 400 to mediate data in a network 414 with an entity that is external to the computer system 400 through any communication protocol supported by the computer system 400 and the external entity. Examples of the network interface device 412 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 406, non-volatile memory 410, machine-readable medium 426) can be local, remote, or distributed. Although shown as a single medium, the machine-readable medium 426 can include multiple media (e.g., a centralized/distributed database and/or associated caches and servers) that store one or more sets of instructions 428. The machine-readable (storage) medium 426 can include any medium that is capable of storing, encoding, or carrying a set of instructions for execution by the computer system 400. The machine-readable medium 426 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 410, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 404, 408, 428) set at various times in various memory and storage devices in computing device(s). When read and executed by the processor 402, the instruction(s) cause the computer system 400 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A method for verifying delivery of an object to a device on a terminating end of a voice call, the method comprising:
   receiving, by a rich call data (RCD) system associated with a telecommunications network, a session initiation protocol (SIP) request message to connect the voice call from an originating source to the device on the telecommunications network,
      wherein the SIP request message includes a rich call data (RCD) extension, and
      wherein the object is configured to be presented on a display of the device upon receiving the SIP request message;
   modifying, by the RCD system, the RCD extension to include a unique identifier for the voice call terminating at the device;
   storing a record including a first copy of the unique identifier in association with the voice call for the device,
   receiving a delivery confirmation message indicating that the object was delivered to the device,
      wherein the delivery confirmation message includes a second copy of the unique identifier; and
   verifying, by the RCD system, delivery of the object to the device based on a confirmation that the first copy of the unique identifier included in the record matches the second copy in the delivery confirmation message.

2. The method of claim 1, wherein:
   the RCD extension further includes a uniform resource locator (URL) to the object; and
   modifying the RCD extension includes modifying the URL to include the unique identifier for the voice call terminating at the device.

3. The method of claim 1, wherein:
   the RCD extension further includes a uniform resource locator (URL) to the object,
   the unique identifier includes a session identifier associated with the SIP request message, and
   the modified RCD extension includes the URL appended with the session identifier as a query string.

4. The method of claim 1, wherein:
   the unique identifier includes a randomized or pseudo-randomized number generated by the system.

5. The method of claim 1, wherein:
   the unique identifier includes an issued at (iat) code associated with the SIP request message including the RCD extension, and
   the iat code identifies a time at which the SIP request message including the RCD extension was issued.

6. The method of claim 1, wherein:
   the RCD extension further includes a uniform resource locator (URL) to the object, and
   the modified RCD extension includes the URL appended with the unique identifier as a prefix or as a suffix to the URL.

7. The method of claim 1, wherein:
   the unique identifier is different from any personal identifiable information associated with the originating source or the device on the terminating end.

8. The method of claim 1, wherein:
   the RCD extension further includes a uniform resource locator (URL) to the object stored at a content delivery network (CDN), and
   in response to sending the SIP request message including the modified RCD to the device on the terminating end, the method comprises:
      retrieving the object to be display by sending an HTTPS GET request to the CDN,
      receiving an object file corresponding to the object from the CDN, and
      displaying the object on the display of the device.

9. The method of claim 1, further comprising:
   in response to verifying that the object was sent to the device for display, sending the delivery confirmation message to a confirmation agency for payment.

10. A system configured to verify delivery of a object to a device on a terminating end of a voice call when an originating source attempts to connect the voice call with the device over a telecommunications network, the system comprising:
   at least one hardware processor; and
   at least one non-transitory memory storing instructions, which, when executed by the at least one hardware processor, cause the system to:
      receive, by a rich call data (RCD) system associated with a telecommunications network, a session initiation protocol (SIP) request message to connect the voice call from an originating source to the device on the telecommunications network,
         wherein the SIP request message includes a rich call data (RCD) extension, and
         wherein the object is configured to be presented on a display of the device upon receiving the SIP request message;
      modify, by the RCD system, the RCD extension to include a unique identifier for the voice call terminating at the device;
      store a record including a first copy of the unique identifier in association with the voice call for the device,
      receive a delivery confirmation message indicating that the object was delivered to the device,
         wherein the delivery confirmation message includes a second copy of the unique identifier; and
      verify, by the RCD system, delivery of the object to the device based on a confirmation that the first copy of the unique identifier included in the record matches the second copy in the delivery confirmation message.

11. The system of claim 10, wherein:
the RCD extension further includes a uniform resource locator (URL) to the object, and
modifying the RCD extension includes modifying the URL to include the unique identifier for the voice call terminating at the device.

12. The system of claim 10, wherein:
the RCD extension further includes a uniform resource locator (URL) to the object,
the unique identifier includes a session identifier associated with the SIP request message, and
the modified RCD extension includes the URL appended with the session identifier as a query string.

13. The system of claim 10, wherein:
the unique identifier includes a randomized or pseudo-randomized number generated by the system.

14. The system of claim 10, wherein:
the unique identifier includes an issued at (iat) code associated with the SIP request message including the RCD extension, and
the iat code identifies a time at which the SIP request message including the RCD extension was issued.

15. The system of claim 1, wherein:
the RCD extension further includes a uniform resource locator (URL) to the object, and
the modified RCD extension includes the URL appended with the unique identifier as a prefix or as a suffix to the URL.

16. A device in communication with a rich call data (RCD) server system of a telecommunications network comprising an RCD verification subsystem and an RCD delivery confirmation subsystem, the device comprising:
at least one hardware processor; and
at least one non-transitory memory storing instructions, which, when executed by the at least one hardware processor, cause the device to:
receive, from the RCD subsystem, a session initiation protocol (SIP) request message to connect a voice call from an originating source to the device on the telecommunications network,
wherein the SIP request message includes a modified rich call data (RCD) extension, and
wherein the modified RCD extension includes a unique identifier for the voice call terminating at the device,
wherein an object is configured to be presented on a display of the device upon receiving the SIP request message;
wherein the RCD delivery confirmation subsystem stores a record including a first copy of the unique identifier in association with the voice call for the device
cause the RCD delivery confirmation subsystem to receive a delivery confirmation message indicating that the object was delivered to the device,
wherein the delivery confirmation message includes a second copy of the unique identifier; and
cause verification of the delivery of the object to the device based on a confirmation that the first copy of the unique identifier included in the record matches the second copy in the delivery confirmation message.

17. The device of claim 16, wherein:
the object is stored at a content delivery network (CDN),
the device is caused to send the indication that the object was received by the device to the CDN, and
the CDN is caused to send the deliver confirmation to the RCD delivery confirmation subsystem.

18. The device of claim 16, wherein:
the RCD extension further includes a uniform resource locator (URL) to the object; and
the modified RCD extension includes a modified URL including the unique identifier for the voice call terminating at the device.

19. The device of claim 16, wherein:
the RCD extension further includes a uniform resource locator (URL) to the object,
the unique identifier includes a session identifier associated with the SIP request message, and
the modified RCD extension includes the URL appended with the session identifier as a query string.

20. The device of claim 16, wherein:
the unique identifier includes a randomized or pseudo-randomized number generated by the system.

* * * * *